Figure 1:
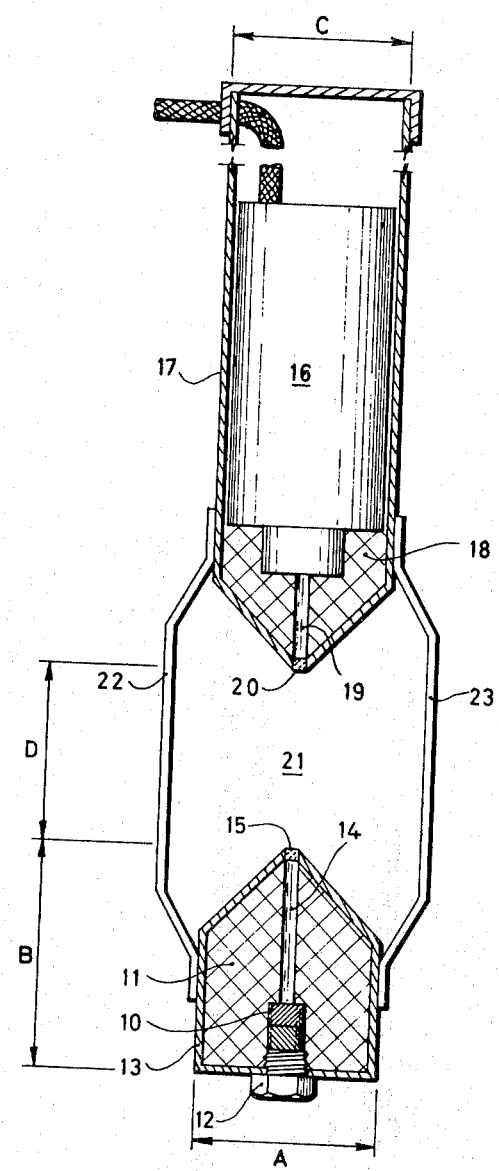

United States Patent [19]
Hinckfuss

[11] 3,794,836
[45] Feb. 26, 1974

[54] IMMERSIBLE ABSORPTION PROBE

[75] Inventor: Douglas Albert Hinckfuss, Broken Hill, New South Wales, Australia

[73] Assignee: The Zinc Corporation Limited

[22] Filed: Mar. 21, 1972

[21] Appl. No.: 236,404

[30] Foreign Application Priority Data
Mar. 25, 1971 Australia............................ 4425/71

[52] U.S. Cl.............................250/363, 250/51.5
[51] Int. Cl. ......................................... G01n 21/26
[58] Field of Search...... 250/43.5 MR, 43.5 R, 51.5, 250/43.5 D

[56] References Cited
UNITED STATES PATENTS
2,761,976  9/1956  Obermaier et al.......... 250/43.5 MR
2,979,620  4/1961  Bradshaw et al. .......... 250/43.5 MR
2,959,677  11/1960  Robinson et al............... 250/43.5 R
2,968,730  1/1961  Morris et al................. 250/43.5 MR
2,873,377  2/1959  McKay ....................... 250/43.5 MR
3,005,100  10/1961  Thompson................... 250/43.5 MR

*Primary Examiner*—Harold A. Dixon
*Attorney, Agent, or Firm*—Eric H. Waters et. al.

[57] ABSTRACT

A method and an immersible absorption probe for the continuous on-stream analysis of the composition of slurries and other liquids comprising immersing in a zone of the main process stream of said slurry the immersible absorption probe incorporating a radioactive source of gamma radiation of energy above 20 keV and a radiation detector, the radioactive source and the radiation detector being spaced from each other in said zone so that the main process stream may flow between them.

12 Claims, 6 Drawing Figures

IMMERSIBLE ABSORPTION PROBE

This invention relates to a method and apparatus for the continuous on-stream analysis of the composition of bodies of liquids, for example slurries, leach liquors and other liquids commonly associated with the mining, chemical engineering, chemical and metallurgical industries.

More particularly the invention preferably concerns measurements of absorption of higher energy gamma radiation, for example, gamma radiation from radioisotopes $Am^{241}$ or $Gd^{153}$, in other words radiation of energy generally above 20 keV, by means of a compact robust probe which is immersed in the main process stream of the slurry or other liquid. (Am = Americium, Gd = Gadolinium).

It is known that absorption measurements are used in the analysis of higher atomic number (approximately upwards of atomic number 40) elements. However, such measurements are limited to methods in which the radiation sources and radiation detectors employed are located outside the main process stream. Usually a sample of the main process stream to be analysed, is extracted and passed through flow cells through which the absorption measurements are made.

Such sampling systems involve long runs of pipelines, pumping, sample splitting and constant head tanks. They are expensive and usually require a large amount of maintenance. Further, there is a risk that the sample material tested is not representative of the main process stream.

Furthermore, the apparatus used in the prior methods referred to above differs essentially from that of the present invention.

According to this invention, a method for the continuous on-stream analysis of the composition of slurries and other liquids comprises immersing in a zone of the main process stream of said slurry an immersible absorption probe incorporating a radioactive source of gamma radiation of energy above 20 keV and a radiation detector, the radioactive source and the radiation detector being spaced from each other in said zone so that the main process stream may flow between them.

The slurry in the zone in which the probe is immersed is preferably in a turbulent state and is in a substantially air-free state or has a low air content.

The radiation source may be, for example, one of the radioisotopes $Am^{241}$ or $Gd^{153}$. The radiation detector is preferably a sodium iodide scintillation crystal.

Apparatus according to the invention comprises an immersible absorption probe for the continuous on-stream analysis of the composition of slurries and other liquids, which comprises an immersible radioactive source housing, a radioactive source mounted in the radioactive source housing, an immersible radiation detector housing, a radiation detector mounted in the radiation detector housing, the radioactive source housing and the radiation detector housing being held in spaced relationship by supporting and aligning struts, the slurry being free to flow between the said housings.

Preferably, a collimated beam from the radiation source is caused to pass through a fixed path length of the liquid. This path length may be varied to suit the particular characteristics of the material under test. The primary collimator from the radiation source is preferably aligned with a secondary collimator in front of and adjacent to the radiation detector.

The primary and secondary collimators preferably comprise cylindrical apertures in lead shields within the radioactive source housing and the radiation detector housing respectively.

The supporting and aligning struts or link members may be adjustable in length.

The overall construction makes for greater simplicity of installation, and for portability, if so desired.

A significant advantage of the invention is that it enables absorption measurements to be made of radiation close to the absorption edges of the elements being determined without any need for extracting a sample stream. In such absorption measurements relatively small path lengths are necessary and except by the method of this invention such small path lengths can only be provided with the aid of flow cells.

The invention thus avoids the need for sampling. Maintenance requirements are kept to a minimum by avoiding the usual difficulties associated with woodchips (from underground timber) causing blockages in constant head tanks, sample splitters and sampling lines in general. The latter are naturally also subject to blockages from solids' segregates in slurries.

A further advantage of the invention is that by immersing the radiation detector in the liquid the adverse effects on accuracy of variations in ambient air temperature are substantially eliminated.

The invention will be better understood by reference to the diagrammatic drawings shown in FIGS. 1 to 5A herewith.

FIG. 1 represents a vertical section of an immersible absorption probe constructed according to the invention. Typical dimensional details pertinent to FIG. 1 are shown in Table 1.

Figure 2:
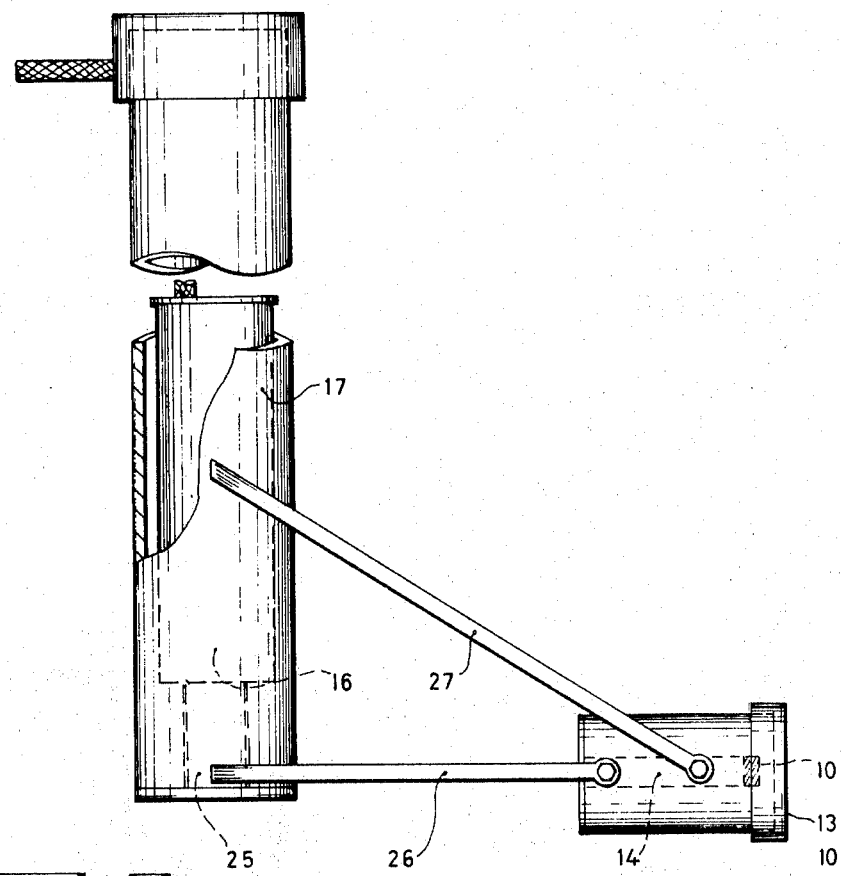
Figure 3:
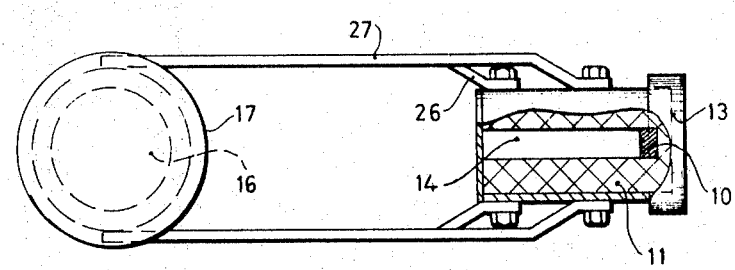

FIGS. 2 and 3 represent a form of the invention which is especially adapted to make absorption measurements in the top layers of bodies of liquids without restricting the lateral movements of such top layers. One application of this configuration is to effect absorption measurements for elemental analysis on the overflow from rake classifiers. FIG. 2 is a side elevation and FIG. 3 a plan view of this form of the invention.

Figure 4:
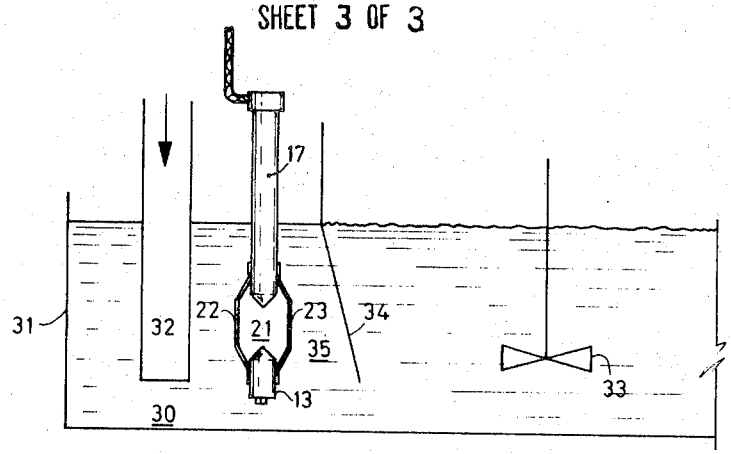
Figure 5:
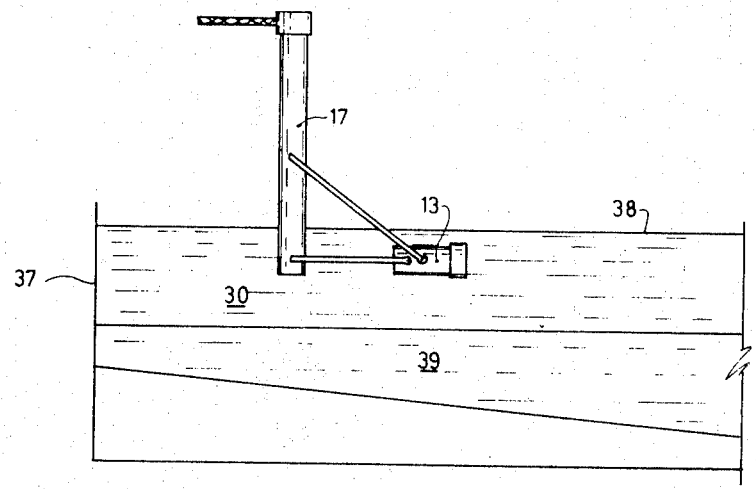
Figure 5A:
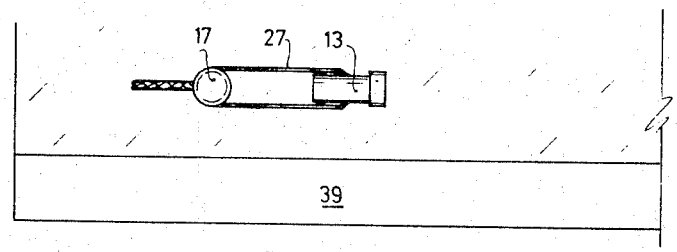

FIG. 4 is an "in situ" diagrammatic view in sectional elevation of the probe shown in FIG. 1, in a flotation cell, and FIGS. 5 and 5A are "in situ" diagrammatic views, in sectional elevation and plan respectively, of the probe shown in FIGS. 2 and 3, in a rake classifier bath.

Referring to FIG. 1, a radioactive source 10 is located in a recess formed in a lead shield 11 and is held in position by a screw plug 12. A radioactive source housing 13 surrounds the lead shield 11. A cylindrical aperture 14, which constitutes a primary collimator, is formed in the shield 11, and the end of the collimator 14 is closed by a perspex plug 15.

A radiation detector 16 is located in a radiation detector housing 17 and a lead shield 18 is also enclosed in this housing. A secondary collimator 19, in the form of a cylindrical aperture, is formed in the shield 18, and the end of the collimator 19 is closed by a perspex plug 20.

The housings 13 and 17 are spaced apart by a suitable distance so as to provide a space 21 for the liquid between the primary and secondary collimators 14, 19. The housings 13, 17 are held in their relative positions by supporting and aligning struts 22, 23, of which there may be two or more. If desired, these struts 22, 23 may be adjustable in length so as to vary the distance between the housings 13, 17. The housings 13, 17 may be made of steel, stainless steel, polyvinyl chloride or other corrosion-resistant material.

In operation, the device is immersed in the slurry or other liquid to be tested, and the intensity of radiation transmitted through the slurry path 21 is measured by means of the radiation detector.

Typical dimensions of the device shown in FIG. 1 are as follows:

TABLE 1

| Dimension (see FIG. 1) | Immersible absorption probe using Gd$^{153}$ |
|---|---|
| A | 2¼ inches |
| B | 2½ inches |
| C | 2¼ inches |
| D | Variable — ½ to 5 inches |

In the apparatus shown in FIG. 2, the radioactive source 10 is enclosed in a lead shield 11 which is fitted within a housing 13 and the radiation from the source 10 is emitted through collimator 14.

The radiation detector 16 is enclosed in housing 17 and a scintillation crystal 25 is provided at the end of the housing 17 opposite to the housing 13. The housings 17 and 13 are held in their spaced-apart positions by struts 26 and braces 27. In this arrangement, the housing 13 containing the radioactive source 10 and the end of the housing 17 containing the radiation detector 16 are immersed in the liquid. This arrangement is particularly suitable for making measurements in the top layers of bodies of liquids.

FIG. 4 is an example of a typical application wherein an immersible absorption probe of the type shown in FIG. 1 is immersed in the main process stream of pulp in the analysis zone 35 of a flotation cell 31. The pulp 30 in the zone 35 is turbulent and substantially air-free. The turbulence is created by the discharge of pulp from delivery line 32 into the limited volume of the analysis zone 35. The substantially air-free state is ensured by preventing air from entering the delivery pipe 32 and by extending the discharge of the delivery pipe 32 below the surface of the analysis zone 35 to prevent air being entrained with the inflow of the pulp stream. The froth baffle 34 and the general flow of pulp from the analysis zone 35 prevent air from the flotation assembly 33 entering the analysis zone 35. The pulp 30 flows continuously through the space 21 between the housings 13 and 17 and the radiation absorption is measured continuously, e.g., to determine the lead content.

In the arrangement shown in FIGS. 5 and 5A, an immersible absorption probe of the type shown in FIGS. 2 and 3 is immersed in the upper layers of the slurry 30 in a rake classifier bath 37. The slurry 30 overflows over overflow lip 38 into the launder 39. The slurry 30 flows continuously through the space between the housings 13 and 17 and the radiation absorption is measured continuously, e.g. to determine the lead content.

Typical results obtained with the immersible abosrption probe of this invention on various types of slurry at The Zinc Corporation (Z.C.) and New Broken Hill Consolidated Limited (N.B.H.C.) mines at Broken Hill, New South Wales, Australia, are given below.

LEAD ANALYSIS

| Stream | Range % Lead | RMS Error % Pb | COR COEF | % Lead |
|---|---|---|---|---|
| Z.C. Flotation Feed | 11.7 to 28.7 | 0.44% | 0.98 | $A_1 \log N_{Pb} + A_2 \log N_D + A_3$ |
| N.B.H.C. Flotation Feed | 6.3 to 9.4 | 0.41% | 0.82 | $A_1 \log N_{Pb} + A_2 \log N_D + A_3$ |

Legend
$N_{Pb}$ = Lead gauge count-rate
$N_D$ = Density gauge count-rate
$A_1, A_2, A_3$ = Constants
RMS = Root mean square
COR COEF = Correlation coefficient The accuracy of the results obtained compares favourably with that from other absorption techniques which do not offer comparable simplicity of installation and robustness of construction and are consequently more expensive to operate and maintain.

We claim:

1. A method for the continuous on-stream analysis of the composition of slurries and other liquids which comprises immersing in a zone of the main process stream of said slurry an immersible absorption probe incorporating a radioactive source of gamma radiation of energy above 20 keV and a radiation detector, the radioactive source and the radiation detector being spaced from each other in said zone so that the main process stream may flow between them, maintaining a substantially direct radiation path from the radioactive source to the radiation detector through the process stream, and wherein the energy of the radiation from the radioactive source is close to the absorption edge of the element being determined.

2. A method according to claim 1 wherein the metal contents of said slurry are determined by said analysis.

3. A method according to claim 1 wherein the slurry in the said zone is in a turbulent state and is in a substantially air-free state or has a low air content.

4. A method according to claim 1 wherein the distance between the radioactive source and the radiation detector is variable.

5. A method according to claim 1 wherein the radioactive source is the radioisotope Gd$^{153}$ and the lead content of the slurry is determined.

6. An immersible absorption probe for the continuous on-stream analysis of the composition of slurries and other liquids, which comprises an immersible radioactive source housing, a radioactive source mounted in the radioactive source housing, an immersible radiation detector housing, a radiation detector mounted in the radiation detector housing, the radioactive source housing and the radiation detector housing being held in spaced relationship by supporting and aligning struts, the slurry being free to flow between the said housings.

7. An immersible absorption probe according to claim 6 wherein a lead shield is mounted in the radioactive source housing, a recess is formed in the lead shield, and the radioactive source is located in the said recess.

8. An immersible absorption probe according to claim 6 wherein the radiation from the radioactive source passes through a primary collimator in the radioactive source housing and a secondary collimator in the radiation detector housing, the primary and secondary collimators being in alignment.

9. An immersible absorption probe according to claim 8 wherein the primary and secondary collimators comprise cylindrical apertures formed in lead shields within the respective housings.

10. An immersible absorption probe according to claim 6 wherein the supporting and aligning struts are adjustable in length.

11. An immersible absorption probe according to claim 6 wherein the radioactive source housing is mounted substantially in vertical alignment with the radiation detector housing.

12. An immersible absorption probe according to claim 6 wherein the radioactive source housing is mounted substantially in horizontal alignment with the lower end of the radiation detector housing.

* * * * *